United States Patent
Janus

(10) Patent No.: US 9,707,915 B2
(45) Date of Patent: Jul. 18, 2017

(54) MULTIPLE PIECE DAMAGE PREVENTION DEVICE FOR MOTOR VEHICLES

(71) Applicant: Ronald Janus, Fort Myers, FL (US)

(72) Inventor: Ronald Janus, Fort Myers, FL (US)

( * ) Notice: Subject to any disclaimer, the term of this patent is extended or adjusted under 35 U.S.C. 154(b) by 0 days.

(21) Appl. No.: 14/960,528

(22) Filed: Dec. 7, 2015

(65) Prior Publication Data

US 2017/0158150 A1  Jun. 8, 2017

(51) Int. Cl.
| | |
|---|---|
| *B60R 19/42* | (2006.01) |
| *B60R 19/44* | (2006.01) |
| *B60R 13/04* | (2006.01) |
| *B60R 19/02* | (2006.01) |

(52) U.S. Cl.
CPC .............. *B60R 19/42* (2013.01); *B60R 13/04* (2013.01); *B60R 19/023* (2013.01); *B60R 19/445* (2013.01)

(58) Field of Classification Search
CPC ..... B60R 13/04; B60R 13/043; B60R 19/023; B60R 19/24; B60R 19/42; B60R 19/445
USPC .................................. 293/108, 109, 126, 128
See application file for complete search history.

(56) References Cited

U.S. PATENT DOCUMENTS

| | | | | |
|---|---|---|---|---|
| 2,889,165 | A * | 6/1959 | Zientara | B60R 13/04 105/285 |
| 4,014,583 | A * | 3/1977 | Forbes | B60R 13/04 293/128 |
| 5,071,181 | A * | 12/1991 | Wagner | B60R 13/04 24/265 R |
| 7,635,152 | B1 | 12/2009 | Janus | |
| 2002/0105197 | A1* | 8/2002 | Unterwagner | B60R 13/04 293/128 |
| 2007/0278804 | A1* | 12/2007 | Shields | B60J 11/025 293/128 |
| 2009/0026776 | A1* | 1/2009 | Simmons | B60R 19/42 293/128 |

* cited by examiner

*Primary Examiner* — Jason S Daniels
(74) *Attorney, Agent, or Firm* — Harpman+Harpman

(57) ABSTRACT

A multiple piece device for preventing damage to automotive vehicles includes a mounting section that is secured to the vehicle and a cushioning piece that is separate and distinct from and releasably attached to the support section. The support section itself may include one or multiple pieces that are fastened to the cushioning piece in various ways.

4 Claims, 5 Drawing Sheets

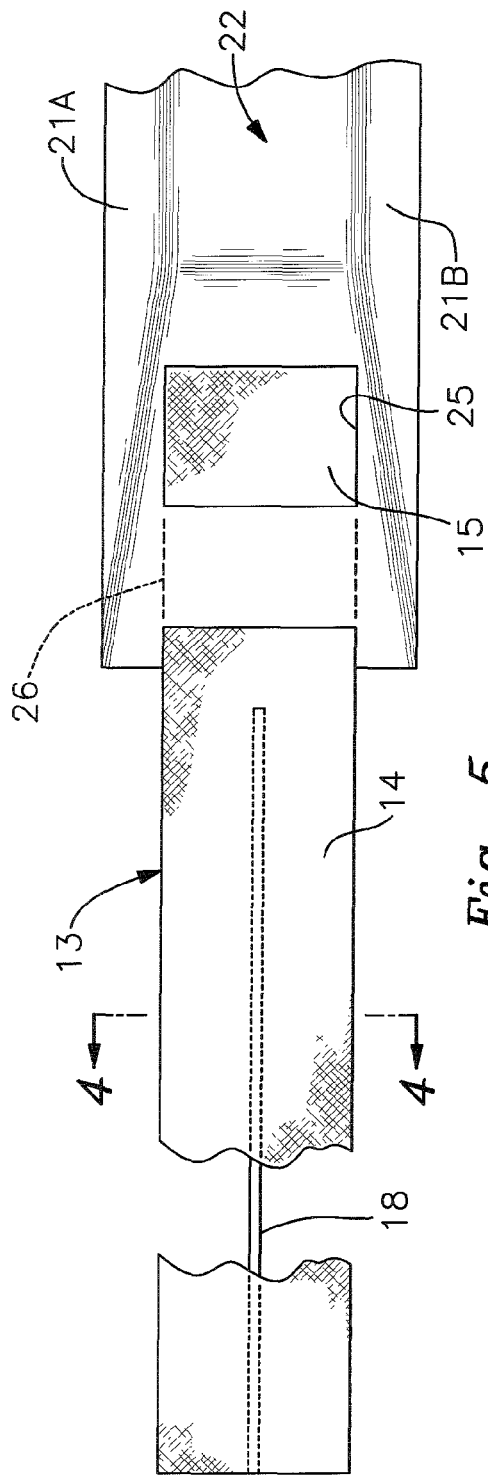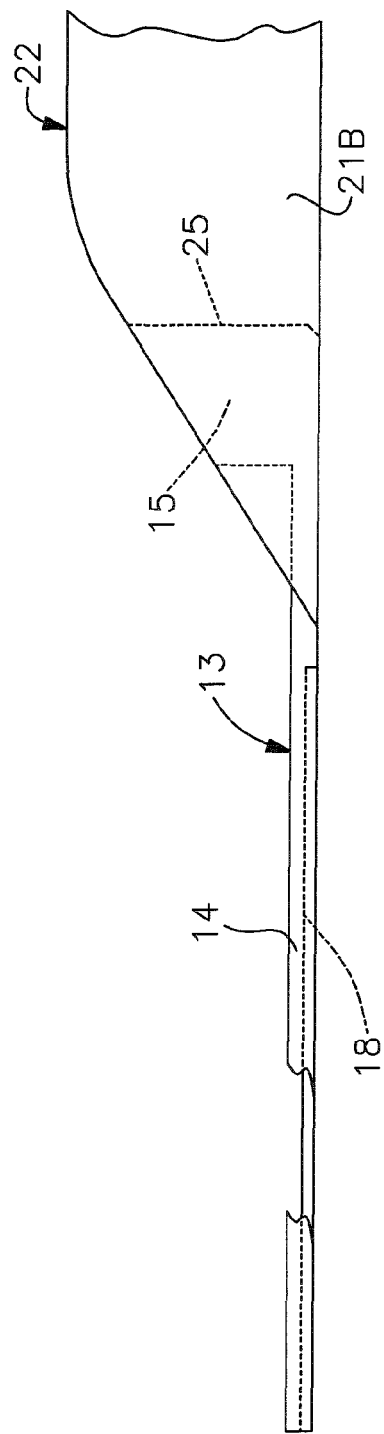

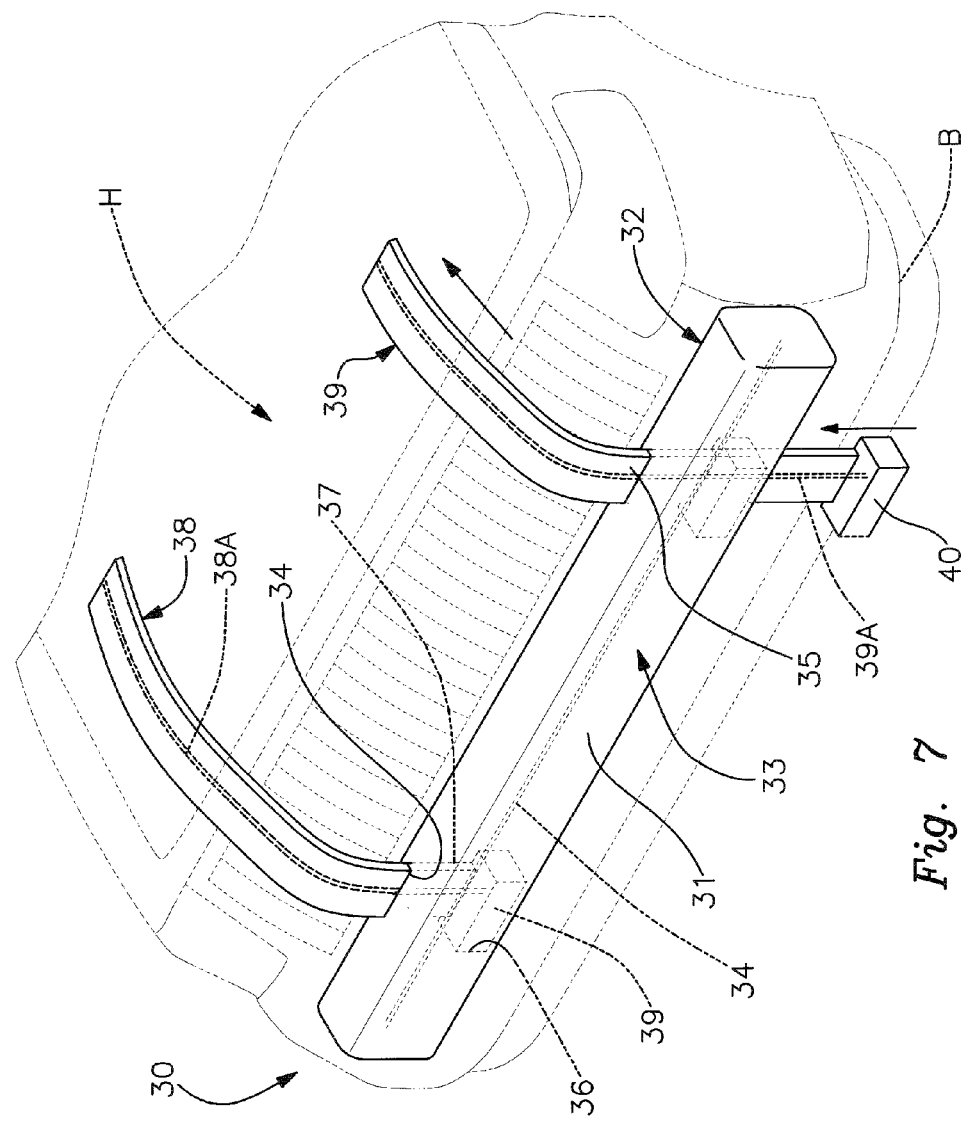

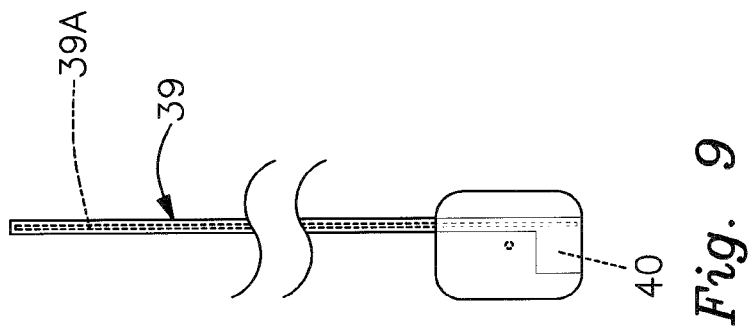
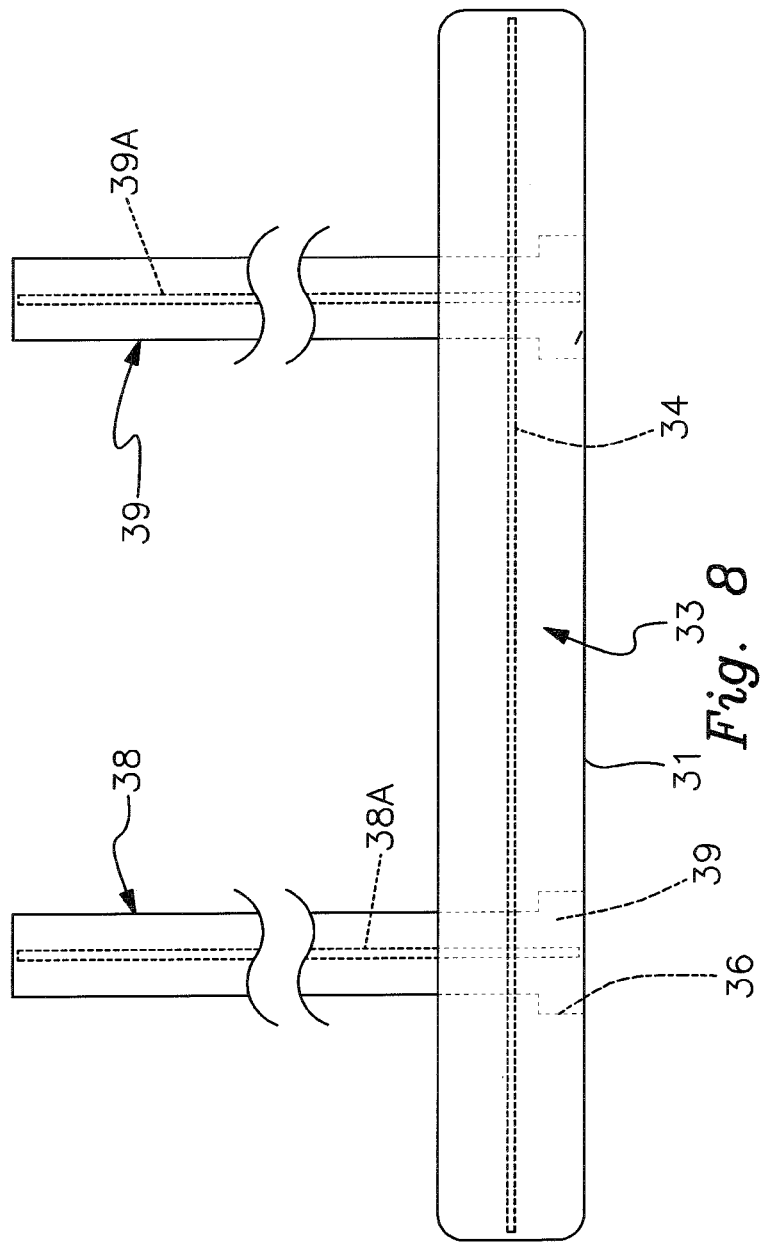

MULTIPLE PIECE DAMAGE PREVENTION DEVICE FOR MOTOR VEHICLES

BACKGROUND OF THE INVENTION

Technical Field

This invention relates to multiple piece apparatus for protecting a motor vehicle from damage when the vehicle is parked.

Description of Prior Art

Cars and other motor vehicles parked adjacent to each other in parking lots or parking garages frequently receive dents from the doors of adjacent vehicles when they are irresponsibly opened. While most parking spaces are marked, many drivers do not make an effort to park parallel with the marked lines. This results in many car doors being too close to each other. When such doors are opened, they are apt to dent, ding/or scratch the adjacent door.

Various automotive door guards have been introduced. Applicant's U.S. Pat. No. 7,635,152 discloses a molded, one piece elongated door guard that is designed to be wedged between the car door and the body of the vehicle when the door is closed. Although this provides satisfactory protection to the vehicle in many cases, the one piece molded door guard can require a fairly expensive mold in order to manufacture the product. In addition, if the door guard is vandalized or torn, it must be entirely replaced. Conventional door guards also do not satisfactorily protect the front and rear bumpers of the vehicle.

SUMMARY OF THE INVENTION

It is therefore an object of the present invention to provide a highly effective and easy-to-install multiple piece apparatus that may be designed for protecting either a door or a bumper of an automotive vehicle.

This invention features an automotive damage prevention device including at least one cushion mounting section for wedging between the body of the vehicle and a pivoting closure of the vehicle when that closure is shut. A separate cushion section includes receptacles for receiving the respective and mounting sections to attach the cushion section thereto. The cushion section has an elongated shape and a resilient composition. When the mounting sections are attached to the vehicle, the separate cushion section extends across the vehicle to protect the vehicle against damage from an adjacent vehicle.

The mounting sections include a pair of deformable mounting components for securing to respective receptacles formed in opposite ends of the cushion section.

In alternative versions, a protective device is provided for the front and rear bumpers of the vehicle. The device includes a cushioned bumper guard having an interior surface for engaging a respective bumper of the vehicle.

DETAILED DESCRIPTION OF THE INVENTION

FIG. 5 is an enlarged partial top plan view of a door guard retainment portion.

FIG. 6 is an enlarged front elevational view thereof.

FIG. 7 is a perspective view of an alternate version of the device, depicting a bumper guard that is releasably secured to a vehicle to protect either the front or rear bumper of the vehicle, shown in broken lines.

FIG. 8 is a front elevational view of the bumper guard.

FIG. 9 is an end view thereof.

DESCRIPTION OF THE PREFERRED EMBODIMENT

Figure 1:
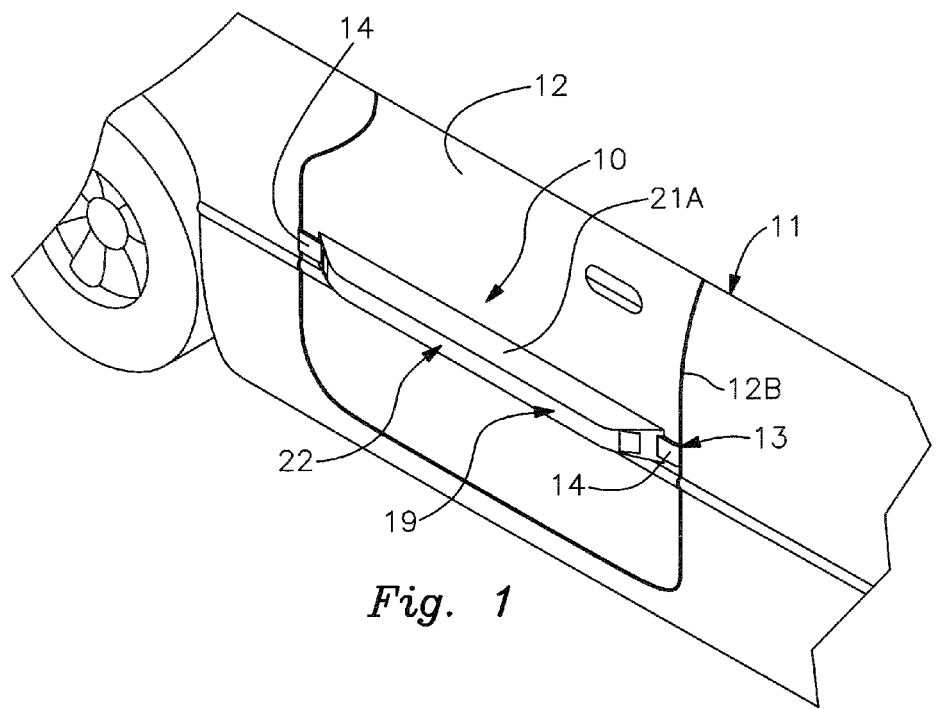
FIG. 1 is a perspective view of a multiple piece damage prevention device secured to a door of an automotive vehicle in accordance with this invention.

Referring now to FIG. 1 of the drawings, a multiple piece damage prevention device 10 can be seen secured to an automotive vehicle 11 in order to prevent damage to door 12 resulting from the careless opening of adjacent doors (not shown). The damage prevention device 10 includes a pair of mounting portions 13 that are fastened to the door 12 in a manner described more fully hereinafter.

Figure 3:
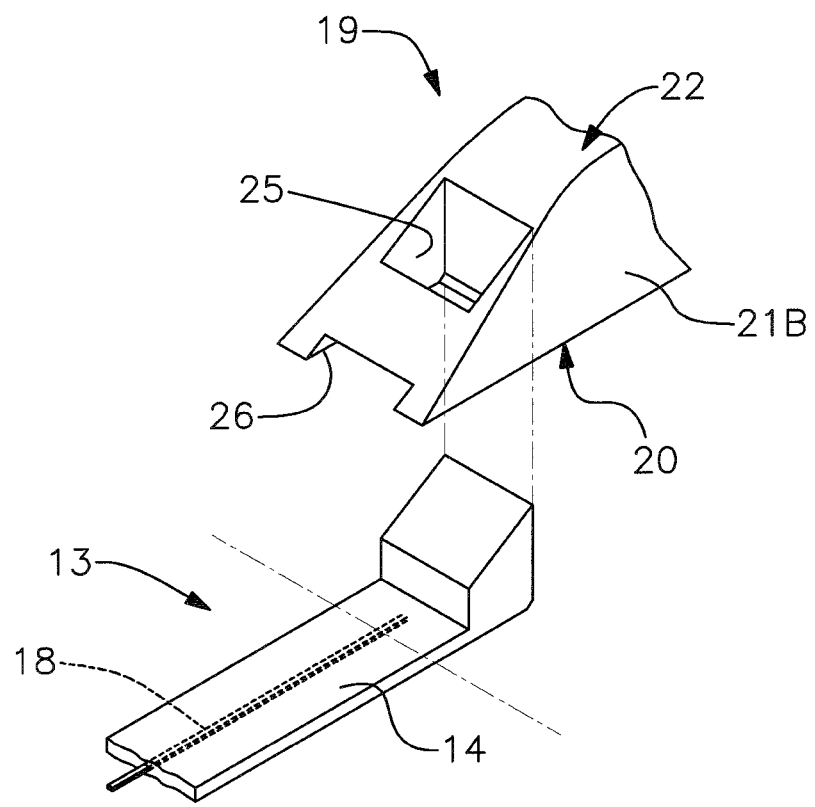
FIG. 3 is an exploded partial perspective view of the vehicle protection device wherein a mounting section is attached to the cushion piece by an interlocking plug and receptacle construction.
Figure 4:
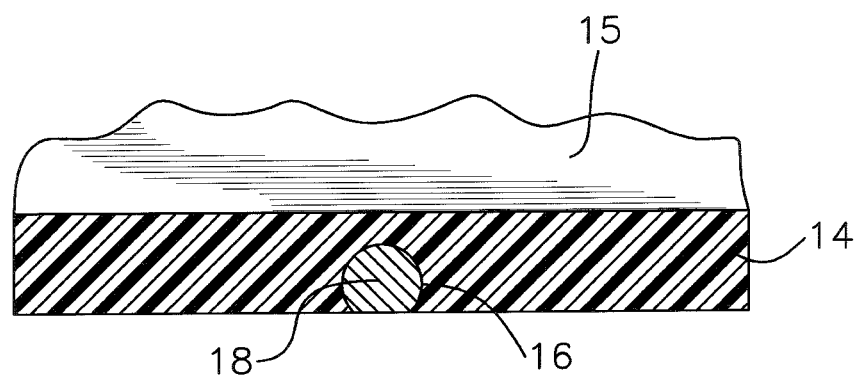
FIG. 4 is an enlarged sectional view on lines 4-4 of FIG. 5.

The mounting portions 13 thus seen in FIGS. 3, 5, and 6 of the drawings have a deformable tab portion 14 and an integral upstanding, locking receptacle plug 15. The tab portion 14 has an elongated open tubular channel 16 formed in its bottom surface 17 centrally therein. A bendable wire reinforcement 18 is registerably positioned therewithin as best seen in FIG. 4 of the drawings. The wire reinforcement 18 provides for select deformability of the tab portion 14 for placement between the respective front and rear door edges 12A and 12B as will be described in greater detail hereinafter.

An elongated cushioning component 19 can be seen secured to and between the mounting portions 13. The cushioning component 19 is typically molded and comprised of a resilient cushioning material, such as polyfoam and various polymers which may be utilized. The cushioning component 19 may have assorted configurations and is preferably wide and thick enough to prevent damage that commonly occurs when an adjacent vehicle door (not shown) is carelessly opened and allowed to strike vehicle.

The cushioning component 19 is transversally tapered from a flat based 20 defining respective contoured sidewalls 21A and 21B terminating in a spaced parallel top surface 22. Each of the cushioned components 19 ends have an inwardly extending tapered longitudinal surface 23 and 24 with a retainment registration opening 25 therein respectively, as best seen in FIG. 3 of the drawings. A mounting recess 26 is formed within the flat based 20 inwardly of the respective cushioned component ends interconnecting with the hereinbefore described retainment receptacle openings 25, as best illustrated in FIG. 6 of the drawings.

The receptacle openings 25 have an interior shape that closely conforms to and lockably engages with the locking plug 15 of the mounting portions 13. The mounting and cushioning pieces are both resilient with the central periphery 27 of the respected receptacle openings 25 are of a size that is slightly smaller than that of the peripheral size of the locking plug 15. It will be evident therefore that as a result, the cushioning component 19 is secured to the mounting components 13 by pushing the plug 15 through the central periphery 27 and thereby engaging and retaining the locking plug 15 snuggly and securely therewithin. Accordingly, no glue or other adhesive is used, which affords ease of attachment and removal as may be required.

Once so engaged, the tab 14 of the respective mounting portion 13 extends outwardly through the recess 26 within the flat based 20 of the cushioned component 19 as described. A second mounting portion 13 is therefore likewise attached to the analogous structure at the opposite end of the cushion component 19, thus completing the assembly for placement and retainment on the door 12 as seen in FIG. 1 of the drawings.

Figure 2:
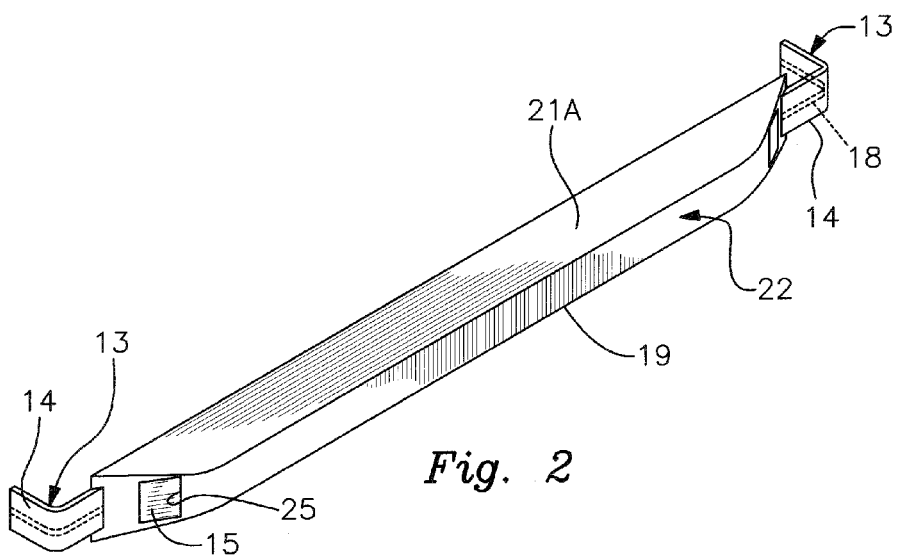
FIG. 2 is an enlarged perspective view of the assembled multiple piece device wherein an extruded cushion piece is received by a pair of support and attachment fittings.

After the two mounting portions 13 have been secured to the cushioning component 19 in the foregoing manner, the damage prevention device 10 is releasably attached to the door 12 of the vehicle. In particular, this is accomplished with the respective deformable tabs 14 which are bent as illustrated in FIG. 2 of the drawings, and then able to be wedged and received between the front edge of the door 12 and the body of the vehicle 11 and the rear of the door edge and body of the vehicle, as seen and noted in FIG. 1 of the drawings.

It will be evident from the above description that the deformability of the respective tabs 14 can be selectively formed and reformed depending on use requirements, given the bendable wire reinforcement 18 positioned therewithin.

Referring now to FIGS. 7, 8, and 9 of the drawings, an alternate multiple piece bumper guard assembly 30 can be seen. The bumper guard assembly 30 includes an elongated cushion piece 31 composed of a material analogous to that previously described. The cushion piece 31 has a generally flat interior and exterior surface, 32 and 33 respectively. A deformable wire reinforcement insert 34 is positioned within the cushion piece 31 longitudinally as best seen in FIGS. 8 and 9 of the drawings.

A pair of mounting openings 34 and 35 are formed transversally through the cushion piece 31 between the respective interior and exterior surfaces 32 and 33. Each of the passageways 34 and 35 includes a large diameter bottom portion 36 and smaller diameter portion 37 that extends therefrom along the interior surface 32.

Bumper guard assembly 30 also includes a pair of mounting inserts 38 and 39 that are composed of a flexible synthetic material analogous to that forming the mounting portion 13. The mounting inserts 38 and 39 may be flat, cylindrical or include alternate shapes. The inserts have a deformable wire 38A and 39A. Each of the inserts 37 and 38 include a relatively wide end stop portion 39 that generally confirms in shape to the large diameter bottom 36 as hereinbefore described. Each of the inserts further includes a narrow portion 40 extending therefrom that conforms in shape with the narrow portion 37 of the respective transverse openings 34 and 35 that extend through the cushion piece 31.

To secure the bumper guard assembly 30 to the vehicle 12 so that it protectively covers a respective front and/or rear bumper (not shown), the so configured cushion piece 31 is engaged against the selected bumper B such that its interior surface 32 directly touches the bumper B. The inserts 37 and 38 are then inserted through the respective transverse openings 34 and 35. The free ends of the inserts extend up from the cushion piece 31 and then are installed between the body of the vehicle 11 and (depending upon which bumper is being protected) the hood H as illustrated in broken lines in FIG. 7 of the drawings, or the trunk (not shown) of the vehicle.

When as illustrated the hood H is closed, the respective inner ends 37A and 38A of each insert is captured therebetween and secured to the vehicle.

The wide end stop portions 39 which are engaged within the cushioned piece 31 as described essentially supports and holds the bumper guard 30 assembly against the bumper B and affords protection against possible damage from other vehicles. Such damage most typically occurs when the other vehicle carelessly backs up or otherwise maneuvers in tight parking or garage spaces, as will be well understood by those skilled within the art.

It will be further be evident that the interchangeability of the elements as hereinbefore described in both the primary and alternate forms of the invention, provides for simple and quick interchangeability while avoiding expensive repair and damage to the vehicle's door and/or front and rear bumper. In the primary form of the invention, the damage prevention device 10 provides the utility of re-useable respective end mounting portions 13 with interchangeable cushion component 19 therebetween which if damaged can be replaced or substituted as required.

It will thus be seen that new and novel vehicle protection configurations for both the door, front and back bumpers of the vehicle, have been illustrated and described. It will apparent to those skilled in the art that various changes and modifications may be made thereto without departing from the spirit of the invention.

Therefore I claim:

1. A car door damage prevention device comprising,
an elongated molding extending the length of a car door,
receptacle openings extending through said elongated molding inwardly of its respective ends,
a pair of molding mounting portions each having integral upstanding receptacle plug of a known dimension to be registerably received within said respective receptacle opening and a deformable tab portion extending longitudinally therefrom,
respective end portions of said elongated molding and corresponding top surfaces of said inserted respective receptacle plugs are tapered and co-planar to one another, a wire element within said respective deformable tab portions, and
an end tab receiving recess in said elongated molding in communication with said receptacle opening.

2. The car door damage prevention device set forth in claim 1 wherein said elongated molding has a flat door engagement bottom and a parallel spaced flat top surface between its respective end portions.

3. The car door damage prevention device set forth in claim 1 wherein said elongated molding is of a polymer foam material.

4. The car door damage prevention device set forth in claim 1 wherein said deformable tab portions extending to said respective ends of said molding mounting portions, being received in a space between a car body and a hinge end of the car door and an oppositely disposed edge of the car door and the car body respectively.

* * * * *